(12) United States Patent
Sclafani et al.

(10) Patent No.: US 10,556,666 B2
(45) Date of Patent: Feb. 11, 2020

(54) AIRCRAFT WITH STRUT-BRACED WING SYSTEM

(71) Applicant: The Boeing Company, Chicago, IL (US)

(72) Inventors: Anthony J. Sclafani, Alta Loma, CA (US); Adam D. Grasch, Santa Monica, CA (US); Christopher K. Droney, Long Beach, CA (US); Neal A. Harrison, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 15/476,089

(22) Filed: Mar. 31, 2017

(65) Prior Publication Data

US 2018/0281922 A1    Oct. 4, 2018

(51) Int. Cl.
*B64C 3/00*        (2006.01)
*B64C 1/26*        (2006.01)

(52) U.S. Cl.
CPC ...................... *B64C 1/26* (2013.01)

(58) Field of Classification Search
CPC .... B64C 1/26; B64C 3/16; B64C 3/14; B64C 3/10; B64C 39/08; B64C 35/00
See application file for complete search history.

(56) References Cited

U.S. PATENT DOCUMENTS 1,995,090 A * 3/1935 Bellanca .................. B64C 3/16
                                                           244/46
6,340,134 B1 * 1/2002 Meschino ................. B64C 1/26
                                                          244/130

8,141,815 B1 * 3/2012 Hoisington ........... B64C 39/068
                                                            244/37
9,415,856 B2   8/2016 Rawdon et al.
9,481,450 B2 * 11/2016 Pitt ........................... B64C 3/52
(Continued)

FOREIGN PATENT DOCUMENTS

WO        2015150818         8/2015

OTHER PUBLICATIONS

Norris, "Truss-Braced Wings May Find Place on Transonic Aircraft," Aviation Week & Space Technology, Mar. 25, 2016, accessed from http://www.w54.biz/showthread.php?3304-Truss-Braced-Wings-May-Find-Place-On-Transonic-Aircraft on Mar. 23, 2017.
(Continued)

*Primary Examiner* — Medhat Badawi
*Assistant Examiner* — Vicente Rodriguez
(74) *Attorney, Agent, or Firm* — Kunzler Bean & Adamson

(57) ABSTRACT

Disclosed herein is an aircraft that comprises a body, a wing, and a strut. The wing is coupled to and extends from the body. A strut inboard end portion is coupled to and extends from the body and a strut outboard end portion is coupled to and extends from an intermediate portion of the wing. The wing further comprises a first thinned portion adjacent the intermediate portion of the wing. An overall thickness of the first thinned portion of the wing decreases and increases in a spanwise direction along the wing. The strut further comprises a second thinned portion adjacent the outboard end portion of the strut. An overall thickness of the second thinned portion of the strut decreases and increases in a spanwise direction along the strut.

20 Claims, 7 Drawing Sheets

(56) References Cited

U.S. PATENT DOCUMENTS

| | | |
|---|---|---|
| 9,598,176 B2 | 3/2017 | Giamati et al. |
| 10,040,559 B2 * | 8/2018 | Hoisington ............ B64D 27/12 |
| 10,279,891 B2 | 5/2019 | Krebs |
| 2013/0020433 A1 | 1/2013 | Hoisington |
| 2017/0113779 A1 | 4/2017 | Wright |

OTHER PUBLICATIONS

U.S. Appl. No. 15/928,429 dated Mar. 22, 2018.
Ko et al., Transonic Aerodynamics of a Wing/Pylon/Strut Juncture, AIAA, 2003, pp. 1-10.
Ko et al., A-7 Strut Braced Sing Concept Transonic Wing Design, NASA Jul. 12, 2002, pp. 1-150.

* cited by examiner

AIRCRAFT WITH STRUT-BRACED WING SYSTEM

GOVERNMENT LICENSE RIGHTS

This invention was made with Government support under Contract No. NNL10AA05B awarded by National Aeronautics and Space Administration (NASA). The Government has certain rights in this invention.

FIELD

This disclosure relates generally to mobile vehicles, and more particularly to aircraft with wings braced by struts.

BACKGROUND

Some aircraft employ struts or trusses to brace and stiffen wings. Such struts create a channel between the struts and the wings. Under certain operating conditions, shockwaves can form within the channel between the struts and wings. At transonic speeds, shockwaves generally cause an increase in the interference drag acting on the wings and struts. Higher interference drag can lead to a lower flight efficiency of an aircraft.

SUMMARY

The subject matter of the present application has been developed in response to the present state of the art, and in particular, in response to the problems and disadvantages associated with the strut-braced wing systems of conventional aircraft operating at transonic speeds, that have not yet been fully solved by currently available techniques. Accordingly, the subject matter of the present application has been developed to provide an aircraft with a strut-braced wing system that overcomes at least some of the above-discussed shortcomings of prior art techniques.

Disclosed herein is an aircraft that comprises a body, a wing, and a strut. The wing is coupled to and extends from the body. The wing comprises a wing inboard end portion, a wing outboard end portion, opposite the wing inboard end portion, and an intermediate portion between the wing inboard end portion and the wing outboard end portion. The strut comprises a strut inboard end portion and a strut outboard end portion. The strut inboard end portion is coupled to and extends from the body and the strut outboard end portion is coupled to and extends from the intermediate portion of the wing. The wing further comprises a first thinned portion adjacent the intermediate portion of the wing. An overall thickness of the first thinned portion of the wing decreases and increases in a spanwise direction along the wing. The strut further comprises a second thinned portion adjacent the outboard end portion of the strut. The first thinned portion of the wing and the second thinned portion of the strut define an air flow channel between the first thinned portion and the second thinned portion. An overall thickness of the second thinned portion of the strut decreases and increases in a spanwise direction along the strut. The preceding subject matter of this paragraph characterizes example 1 of the present disclosure.

An area of at least a portion of the air flow channel increases in the spanwise direction along the strut away from the body. The preceding subject matter of this paragraph characterizes example 2 of the present disclosure, wherein example 2 also includes the subject matter according to example 1, above.

The wing comprises a first top surface and a first bottom surface. The strut comprises a second top surface and a second bottom surface. The first bottom surface of the wing at the first thinned portion of the wing is concave along a plane parallel to the spanwise direction. The second top surface of the strut at the second thinned portion of the strut is concave along a plane parallel to the spanwise direction. The preceding subject matter of this paragraph characterizes example 3 of the present disclosure, wherein example 3 also includes the subject matter according to any one of examples 1 or 2, above.

The wing comprises a first top surface and a first bottom surface. The strut comprises a second top surface and a second bottom surface. The second top surface of the strut at the second thinned portion of the strut is concave along a plane parallel to the spanwise direction. The preceding subject matter of this paragraph characterizes example 4 of the present disclosure, wherein example 4 also includes the subject matter according to any one of examples 1-3, above.

The wing comprises a first top surface and a first bottom surface. The strut comprises a second top surface and a second bottom surface. The first bottom surface of the wing is curved along first planes parallel to a chordwise direction. A curvature of at least a portion of the first bottom surface of the wing defining the first thinned portion, along the first planes, decreases and increases in the spanwise direction. The preceding subject matter of this paragraph characterizes example 5 of the present disclosure, wherein example 5 also includes the subject matter according to any one of examples 1-4, above.

The wing comprises a first top surface and a first bottom surface. The strut comprises a second top surface and a second bottom surface. The second top surface of the strut is curved along second planes parallel to a chordwise direction. A curvature of at least a portion of the second top surface of the strut defining the second thinned portion, along the second planes, decreases and increases in the spanwise direction. The preceding subject matter of this paragraph characterizes example 6 of the present disclosure, wherein example 6 also includes the subject matter according to any one of examples 1-5, above.

The wing comprises a first top surface and a first bottom surface. The strut comprises a second top surface and a second bottom surface. An entirety of the first bottom surface of the wing, exclusive of the first thinned portion, is planar along a third plane parallel to the spanwise direction. At least a portion of the first bottom surface of the wing defining the first thinned portion is concave along the third plane. An entirety of the second top surface of the strut, exclusive of the second thinned portion, is planar along a fourth plane parallel to the spanwise direction. At least a portion of the second top surface of the strut defining the second thinned portion is concave along the fourth plane. The preceding subject matter of this paragraph characterizes example 7 of the present disclosure, wherein example 7 also includes the subject matter according to any one of examples 1-6, above.

The wing has a span-to-chord ratio of at least 20:1. The preceding subject matter of this paragraph characterizes example 8 of the present disclosure, wherein example 8 also includes the subject matter according to any one of examples 1-7, above.

The aircraft is configured for travel at transonic speeds. The preceding subject matter of this paragraph characterizes example 9 of the present disclosure, wherein example 9 also includes the subject matter according to any one of examples 1-8, above.

The wing extends to a first distance away from the body. The strut extends to a second distance away from the body. The second distance is between about 40% and about 70% of the first distance. The first thinned portion of the wing and the second thinned portion of the strut each begins at a third distance away from the body. The third distance is between about 30% and about 60% of the first distance. The preceding subject matter of this paragraph characterizes example 10 of the present disclosure, wherein example 10 also includes the subject matter according to any one of examples 1-9, above.

Also disclosed herein is an aircraft comprising a body, a wing, and a strut. The wing is coupled to and extends from the body. The strut comprises a strut inboard end portion and a strut outboard end portion, opposite the strut inboard end portion. The strut inboard end portion is coupled to and extends from the body and the strut outboard end portion is coupled to and extends from the wing. The strut further comprises a second thinned portion adjacent the outboard end portion of the strut. An overall thickness of the second thinned portion of the strut decreases and increases in a spanwise direction along the strut. The preceding subject matter of this paragraph characterizes example 11 of the present disclosure.

The strut comprises a top surface and a bottom surface, opposite the top surface. The top surface of the strut is curved along first planes parallel to a chordwise direction. A curvature of at least a portion of the top surface of the strut defining the second thinned portion, along the first planes, decreases and increases in the spanwise direction. The preceding subject matter of this paragraph characterizes example 12 of the present disclosure, wherein example 12 also includes the subject matter according to example 11, above.

A distance between a portion of the wing and a portion of the strut increases in the spanwise direction away from the body. The preceding subject matter of this paragraph characterizes example 13 of the present disclosure, wherein example 13 also includes the subject matter according to any one of examples 11 or 12, above.

The strut comprises a top surface and a bottom surface, opposite the top surface. An entirety of the top surface of the strut, exclusive of the second thinned portion, is planar along a second plane parallel to the spanwise direction. At least a portion of the top surface of the strut defining the second thinned portion is curved along the second plane. The preceding subject matter of this paragraph characterizes example 14 of the present disclosure, wherein example 14 also includes the subject matter according to any one of examples 11-13, above.

At least a portion of the top surface of the strut defining the second thinned portion is concave along the second plane. The preceding subject matter of this paragraph characterizes example 15 of the present disclosure, wherein example 15 also includes the subject matter according to example 14, above.

Additionally disclosed herein is an aircraft that comprises a body, a wing, and a strut. The wing is coupled to and extends from the body. The wing comprises a wing inboard end portion, a wing outboard end portion, opposite the wing inboard end portion, and an intermediate portion between the wing inboard end portion and the wing outboard end portion. The strut comprises a strut inboard end portion and a strut outboard end portion, opposite the strut inboard end portion. The strut inboard end portion is coupled to and extends from the body and the strut outboard end portion is coupled to and extends from the intermediate portion of the wing. The wing further comprises a first thinned portion adjacent the intermediate portion of the wing and an overall thickness of the first thinned portion of the wing decreases and increases in a spanwise direction along the wing. The preceding subject matter of this paragraph characterizes example 16 of the present disclosure.

The wing comprises a top surface and a bottom surface, opposite the top surface. The bottom surface of the wing is curved along third planes parallel to a chordwise direction. A curvature of at least a portion of the bottom surface of the wing defining the first thinned portion, along the third planes, decreases and increases in the spanwise direction. The preceding subject matter of this paragraph characterizes example 17 of the present disclosure, wherein example 17 also includes the subject matter according to example 16, above.

A distance between a portion of the wing and a portion of the strut increases in the spanwise direction away from the body. The preceding subject matter of this paragraph characterizes example 18 of the present disclosure, wherein example 18 also includes the subject matter according to any one of examples 16 or 17, above.

The wing comprises a top surface and a bottom surface, opposite the top surface. An entirety of the bottom surface of the wing, exclusive of the first thinned portion, is substantially planar along a fourth plane parallel to the spanwise direction. At least a portion of the bottom surface of the wing defining the first thinned portion is curved along the fourth plane. The preceding subject matter of this paragraph characterizes example 19 of the present disclosure, wherein example 19 also includes the subject matter according to any one of examples 16-18, above.

At least a portion of the bottom surface of the wing defining the first thinned portion is concave along the fourth plane. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
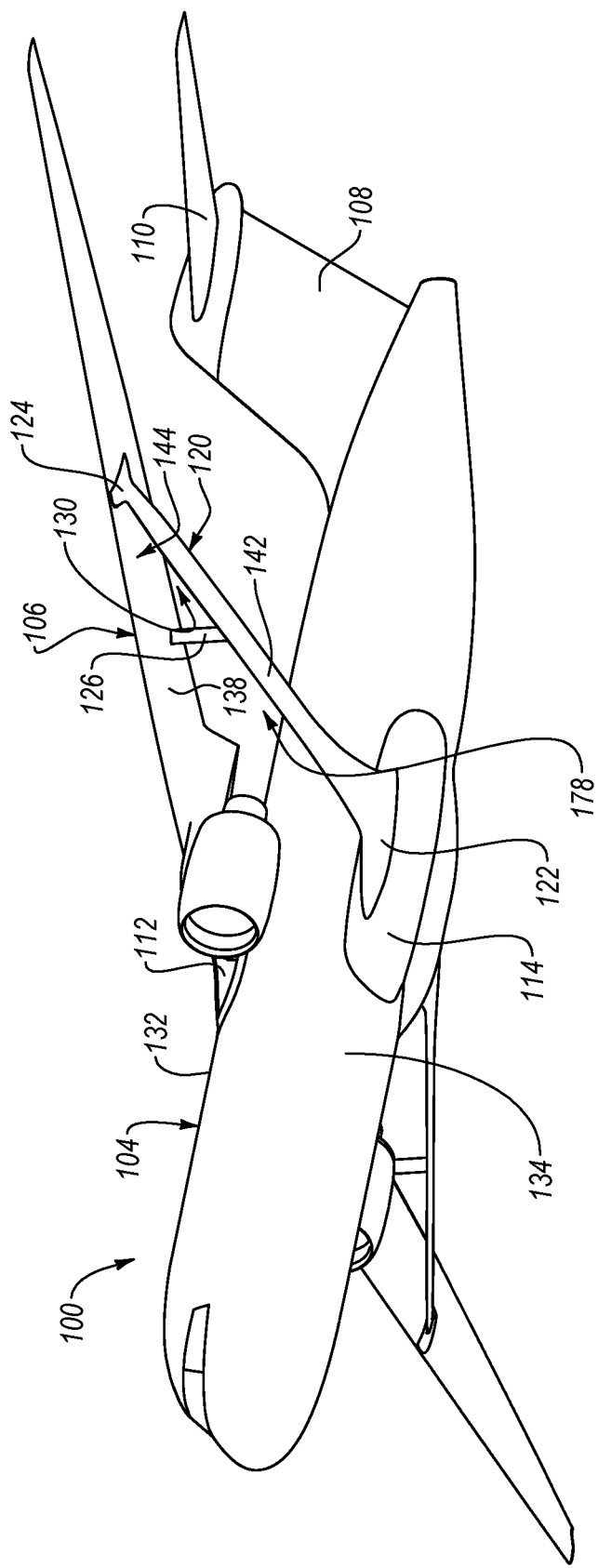
FIG. 1 is a perspective view of an aircraft, according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure provides an aircraft with a high aspect ratio wing braced by a strut. In some implementations, the aircraft is designed to travel at transonic speeds (e.g., free stream Mach number between about 0.7 and about 0.9) and support the commercial or military transportation of mass loads and/or mass passengers. The wing and/or the strut are specifically configured to reduce the strength of shockwaves around the wing and strut (e.g., above the wing, between the wing and strut, and below the strut) that may occur near the intersection of the wing and strut at transonic speeds. It is noted that for an aircraft traveling at transonic speeds, air flow over some of the surfaces of the aircraft (e.g., around leading edges and between the wing and strut) can reach sonic speeds (e.g., free stream Mach number of 1.0 or greater).

Referring to FIGS. 1-4, one embodiment of an aircraft 100 is shown. The aircraft 100 includes a body 104 (e.g., fuselage), a pair of wings 106 coupled to and extending from the body 105, a vertical stabilizer 108 coupled to and extending from the body 105, and a pair of horizontal stabilizers 110 coupled to and extending from the vertical stabilizer 108, or directly from the body 105 in some implementations. The aircraft 100 includes features representative of a commercial passenger, commercial transport, or military transport aircraft. The aircraft 100 also includes a pair of engines 102 operable to propel the aircraft 100 up to at least transonic speeds in some implementations. Accordingly, the features of the aircraft 100, including the body 104 and the wings 106 are configured to promote travel at transonic speeds. The engines 102 are attached to the wings 106, respectively, in the illustrated embodiment. However, in other embodiments, the engines 102 can be attached to other parts of the aircraft 100, such as the vertical stabilizer 108.

The wings 106 have a top surface 136 and a bottom surface 138, opposite the top surface 136. The top surface 136 and the bottom surface 138 define external surfaces of the wings 106. Each wing 106 is attached to the body 104 at a top portion 132 of the body 104 via a wing fairing 112. The wing fairing 112 is coupled to the top portion 132 of the body 104 and facilitates a secure attachment of the wings 106 to the body 104 with no adverse effects on the local flow field. Each wing 106 has a relatively high span-to-chord aspect ratio compared to general aviation aircraft. For example, in one implementation, each wing 106 has a span-to-chord aspect ratio greater than 10:1, and in another implementation, each wing 106 has a span-to-chord aspect ratio equal to or greater than 20:1.

Figure 4:
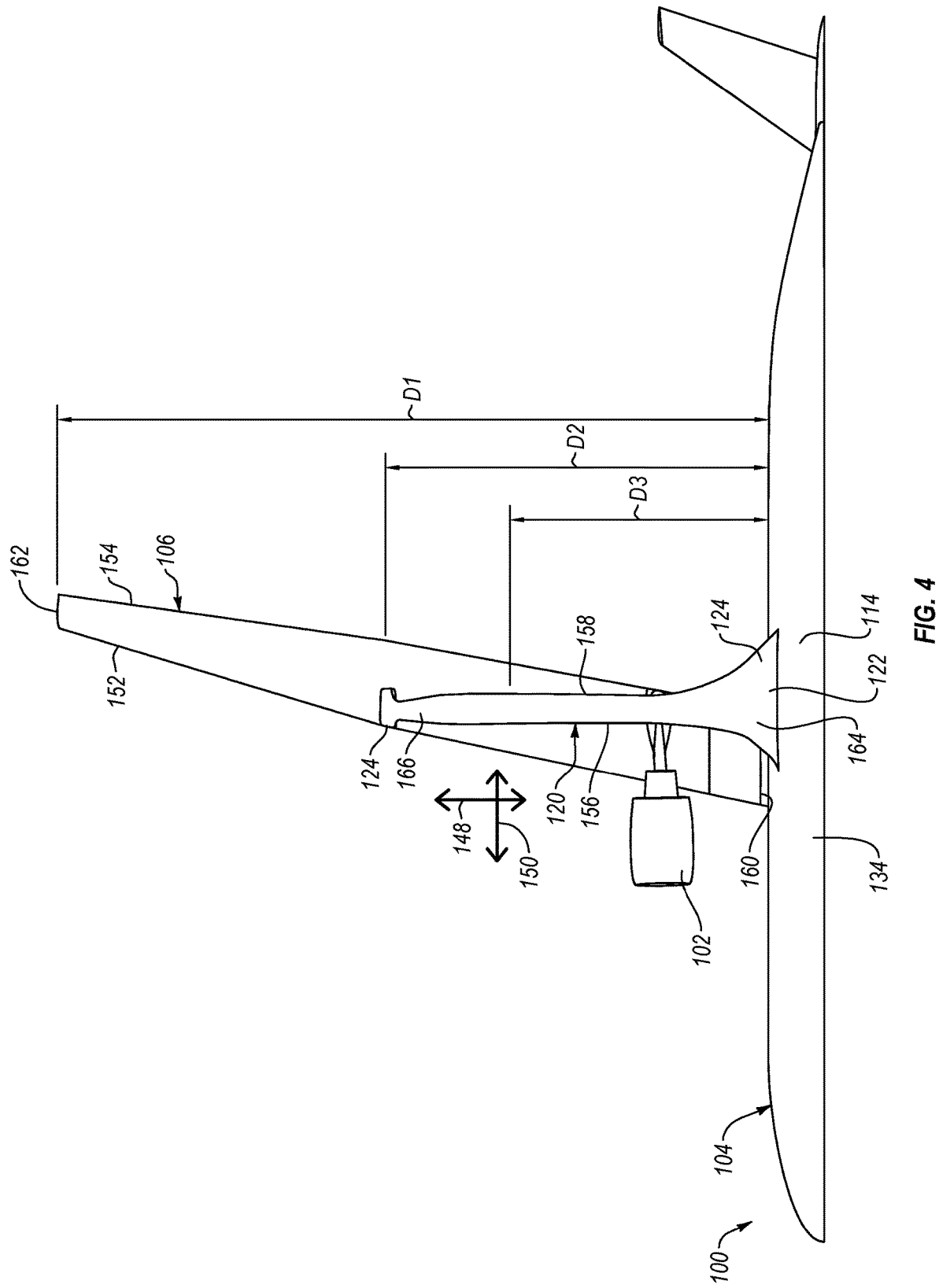
FIG. 4 is a bottom view of the aircraft of FIG. 1, according to one or more examples of the present disclosure.

Generally, as shown in FIG. 4, each wing 106 extends away from the wing fairing 112 in a spanwise direction 148 from a wing inboard end portion 160 to a wing outboard end portion 162, which includes a tip of the wing 106. The wing inboard end portion 160 is a fixed end portion and the wing outboard end portion 162 is a free end portion. Additionally, as also shown in FIG. 4 and into the page in FIG. 2, the chord of each wing 106 at a given location along the span of the wing 106 extends in a chordwise direction 150. Unless otherwise noted, as used herein, a direction identified in the figures by dual directional arrows effectively includes both directions or opposite directions along the identified path. Accordingly, for example, the spanwise direction 148 includes a body-to-wingtip direction along the path identified with dual directional arrows and labeled 148 and a wingtip-to-body direction along the same path.

Because of the high span-to-chord aspect ratio of the wings 106 and high loads placed on the wings 106, such as at transonic speeds, the wings 106 of the aircraft 100 form part of a strut-braced wing system of the aircraft 100, which includes a pair of struts 120 to brace the wings 106. Generally, the struts 120 are configured to act as a stiffening member to promote stiffening of the wings. Furthermore, the struts 120 help to transfer buckling loads away from the wing 106. Although in the illustrated embodiment, one strut 120 is associated with each wing 106, in other embodiments, additional struts, such as one or more jury struts 126 spanning the channel 178 between a wing 106 and a strut 120, can be associated with each wing 106.

The struts 120 have a top surface 140 and a bottom surface 142, opposite the top surface 140. The top surface 140 and the bottom surface 142 define external surfaces of the struts 120. Each strut 120 is attached to the body 104 at a bottom portion 134 of the body 104 via a body-strut fairing 122. Each body-strut fairing 122 facilitates a secure attachment of a respective one of the struts 120 to a landing gear fairing 114. The landing gear fairing 114 is coupled to the bottom portion 134 of the body 104 and is configured to house the landing gear of the aircraft 100. Each strut 120 has a relatively high span-to-chord aspect ratio.

Generally, as shown in FIG. 4, each strut 120 extends away from the body-strut fairing 122 in the spanwise direction 148 from a strut inboard end portion 164 to a strut outboard end portion 166. The strut inboard end portion 164 is a fixed end portion and the strut outboard end portion 166 also is a fixed end portion. The strut outboard end portion 166 is attached to a wing-strut fairing 124 that is coupled to the bottom surface 138 of the wing 106 at an intermediate portion 176 of the wing 106. Accordingly, each strut 120 is coupled to the intermediate portion 176 of a wing 106 via a respective wing-strut fairing 124. The intermediate portion 176 of each wing 106 is located between the wing inboard end portion 160 and the wing outboard end portion 162. Additionally, as also shown in FIG. 4 and into the page in FIG. 2, the chord of each strut 120 at a given location along the span of the strut 120 extends in the chordwise direction 150.

Figure 2:
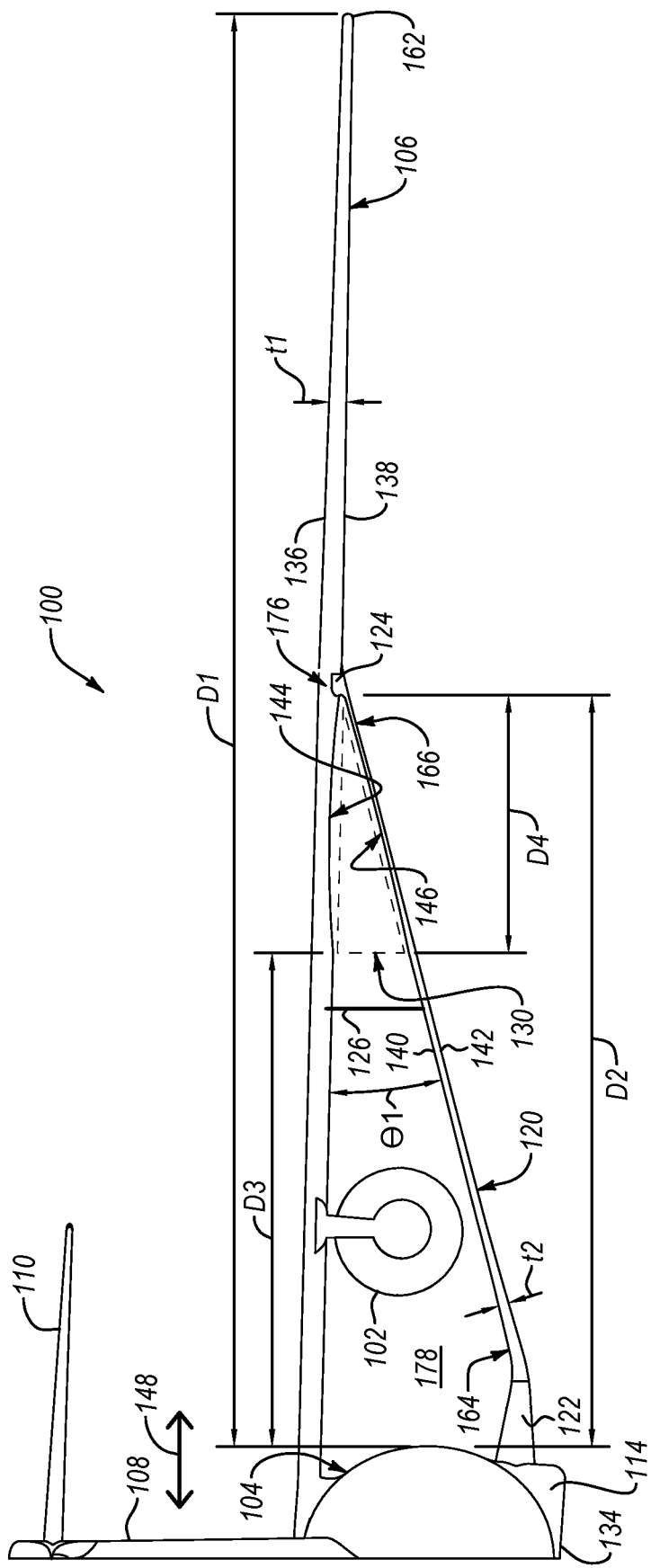
FIG. 2 is a rear view of the aircraft of FIG. 1, according to one or more examples of the present disclosure.
Figure 3:
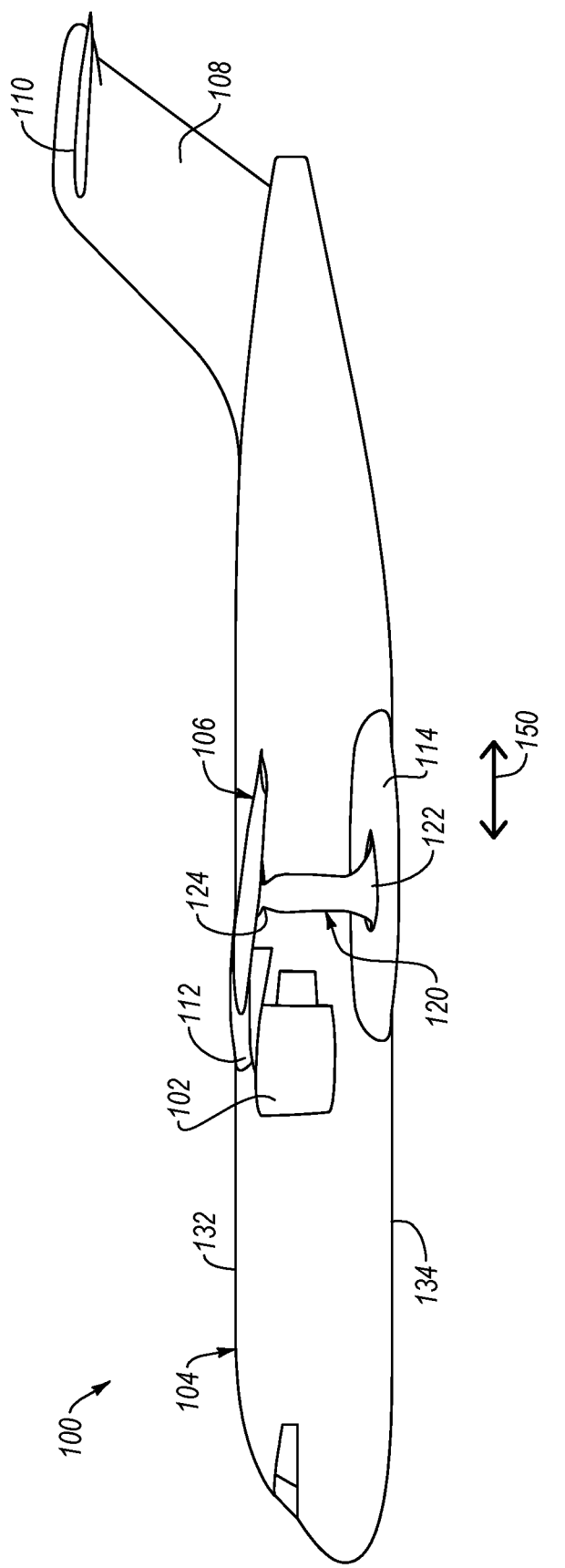
FIG. 3 is a side elevation view of the aircraft of FIG. 1, according to one or more examples of the present disclosure.

Referring now to FIG. 2, the strut 120 is angled upwardly at an angle θ1 relative to the wing 106. In other words, each strut 120 extends upwardly away from the bottom portion 134 of the body 104 at the angle θ1 relative to a respective one of the wings 106. In one implementation, the wings 106 extend away from the body 104 substantially along a horizontal plane with some amount of anhedral. However, in certain implementations, the wings 106 extend away from the body 104 with no anhedral or with some dihedral.

Referring to FIG. 4, each wing 106 extends to a first distance D1 away from the body 104 (e.g., away from a respective side of the body 104). Similarly, each strut 120 extends to a second distance D2 away from the body 104. Accordingly, the intermediate portion 176 of the wing 106 is located at the second distance D2 away from the body 104. In one embodiment, the second distance D2 is between about 40% and about 70% of the first distance D1. According to some implementations, the second distance D2 is between about 50% and about 60% of the first distance D1. In one particular implementation, the second distance D2 is about 58% of the first distance D1.

When viewed from a top or bottom view (see, e.g., FIG. 4), each wing 106 vertically overlaps a respective strut 120 such that a space or channel 178 is defined directly between the bottom surface 138 of the wing 106 and the top surface 140 of the strut 120. Air passes through the channels 178 between the wings 106 and the struts 120 when the aircraft 100 is in motion. At high speeds, such as transonic speeds, air can pass through the channels 178 between the wings 106 and the struts 120 at transonic speeds. Although the channel 178 effectively converges in the spanwise direction 148 away from the body 104, because of the relatively large distance between the wing lower surface 138 and the strut upper surface 140, air passing through the majority of each channel 178 is less inclined to accelerate beyond the transonic regime to reach Mach 1 or greater relative to the air passing around the channel 178. However, air passing through a wing-strut channel 130 of the channel 178 proximate the intersection of a wing 106 and a strut 120 (e.g., adjacent the intermediate portion 176 of the wing 106) is inclined to accelerate to Mach 1 or greater due to the relatively smaller distance between the wing lower surface 138 and the strut upper surface 140 in the wing-strut channel 130 and the increased interaction between these surfaces. Substantial acceleration of air through the wing-strut channel 130, particularly when the aircraft 100 is traveling at transonic speeds, can cause a shockwave above the strut 120 and within the wing-strut channel 130. Shockwaves formed within the wing-strut channel 130 tend to increase interference drag on the associated wing 106 and strut 120. The wing-strut channel 130 initiates at a third distance D3 away from the body 104. Accordingly, the wing-strut channel 130 has a length equal to the difference between the second distance D2 and the third distance D3. In one implementation, the third distance D3 is greater than about 50% of the second distance D2. According to some implementations, the third distance D3 is between about 30% and about 60% (e.g., about 45%) of the first distance D1.

To promote a reduction in the strength of the shockwave generated within the wing-strut channel 130 and a corresponding reduction in the interference drag on the associated wing 106 and strut 120, each wing 106 includes a first thinned portion 144 and/or each strut 120 includes a second thinned portion 146. Whether alone or in combination, and depending on the relative proximity of the wing 106 to the strut 120 and area progression through the channel 130, the first thinned portion 144 and the second thinned portion 146 effectively increase the area of the wing-strut channel 130, which can result in a drop in the acceleration of air passing through the wing-strut channel 130 and thus a reduction in the shockwave and corresponding interference drag.

Each wing 106 has an overall thickness t1 defined as the maximum distance between the top surface 136 of the wing 106 and the bottom surface 138 of the wing 106 at any given location along the wing 106. Some conventional wings on aircraft with or without struts have an overall thickness that gradually reduces at a given rate in the spanwise direction from the body to the tip of the wing. In other words, a conventional wing, on an aircraft with or without struts, does not have a dramatic increase or change in the rate that the overall thickness of the wing decreases in the spanwise direction away from the body to the tip of the wing. Moreover, a conventional wing, on an aircraft with or without struts, does not have an increase in the overall thickness of the wing in the spanwise direction away from the body to the tip of the wing.

Figure 5:
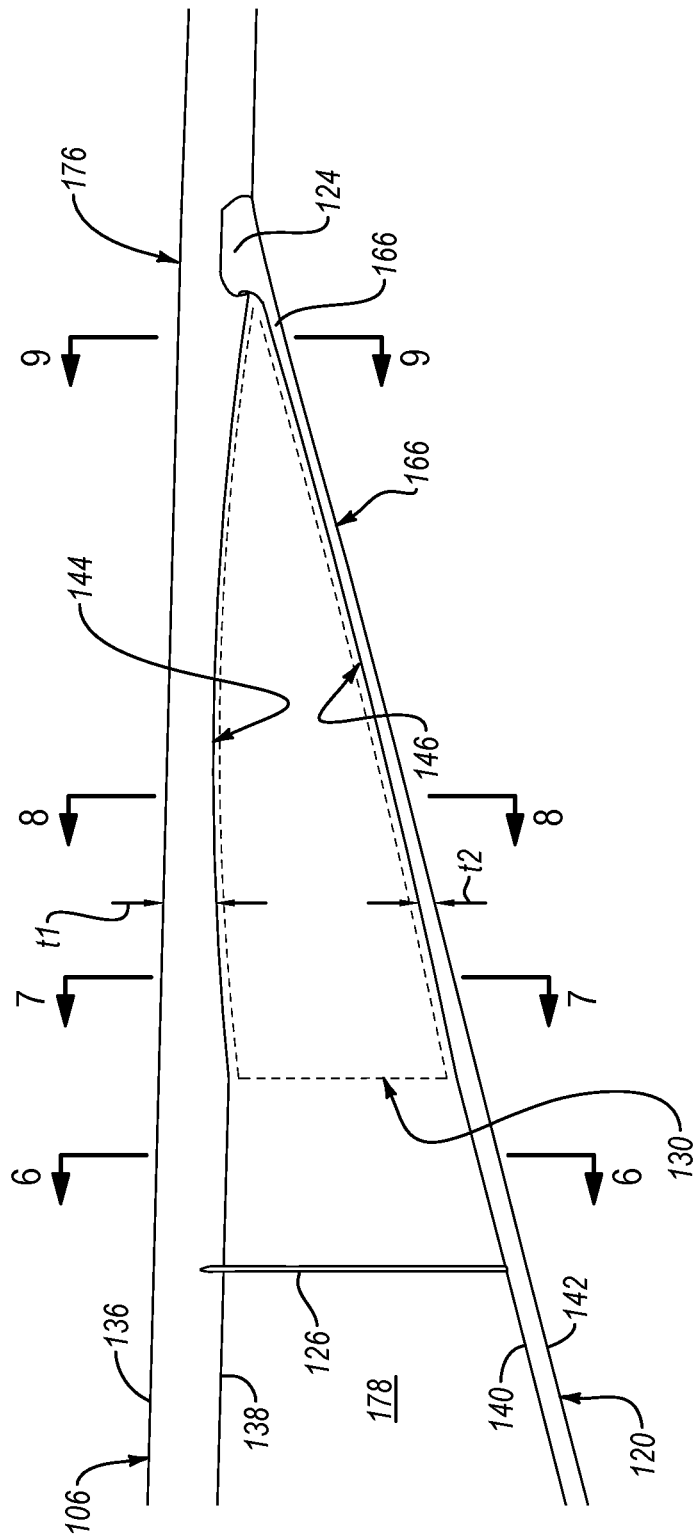
FIG. 5 is an enlarged rear view of a wing and a strut of the aircraft of FIG. 1, according to one or more examples of the present disclosure.
Figure 10:
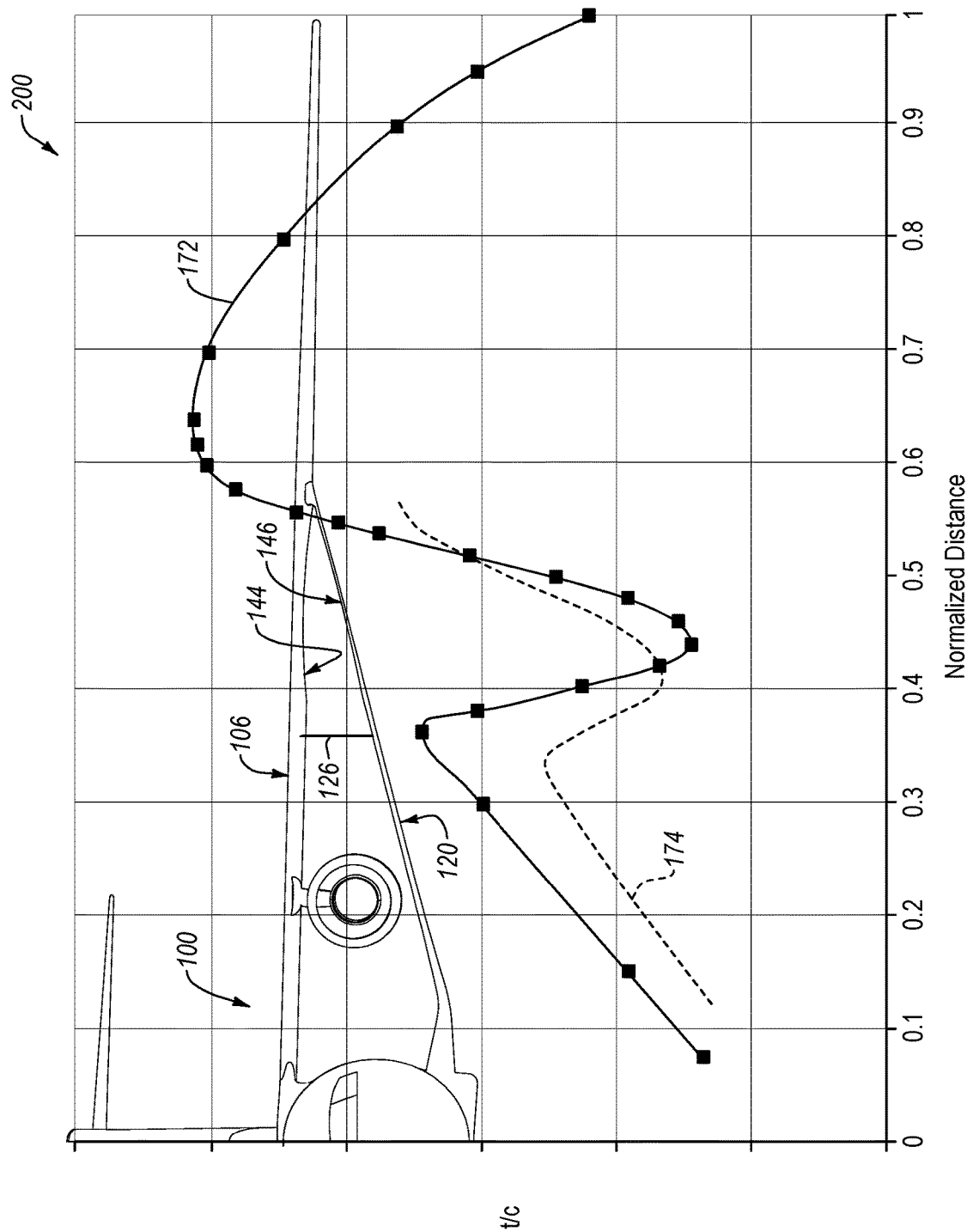
FIG. 10 is a chart comparing a thickness-to-chord ratio (t/c) of the wing and the strut of the aircraft of FIG. 1 compared to a normalized distance from a body of the aircraft, according to one or more examples of the present disclosure.

Referring to FIGS. 5 and 10, contrary to conventional wings on aircraft with struts, the first thinned portion 144 of each wing 106 has an overall thickness t1 that decreases and increases in the spanwise direction 148. In the spanwise direction 148 from the body 104 to the wingtip, the overall thickness t1 of the first thinned portion 144 drops at a rate greater than any rate of reduction of the overall thickness t1 of the wing between the body 104 and the first thinned portion 144. The rate of increase of the overall thickness t1 of the first thinned portion 144 in the spanwise direction 148 from the body 104 to the wingtip can be the same as or different than the rate of reduction of the overall thickness t1 of the first thinned portion 144 in the same direction. As shown by the wing thickness curve 172 of the chart 200 of FIG. 10, which shows one example of many possible examples of the wing thickness curve 172, a thickness-to-chord ratio (t/c) of the wing 106 compared to a normalized distance from the body 104 of the aircraft 100 experiences a dramatic drop at the start of the first thinned portion 144 and a subsequent dramatic increase up to the end of the first thinned portion 144.

The first thinned portion 144 is coextensive with the wing-strut channel 130. Accordingly, in the spanwise direction 148 away from the body 104, the first thinned portion 144 initiates at the third distance D3 away from the body 104 and terminates substantially at the second distance D2. The wing-strut channel 130 is bounded on top by the bottom surface 138 of the wing 106 at the first thinned portion 144 of the wing 106.

Figure 6:
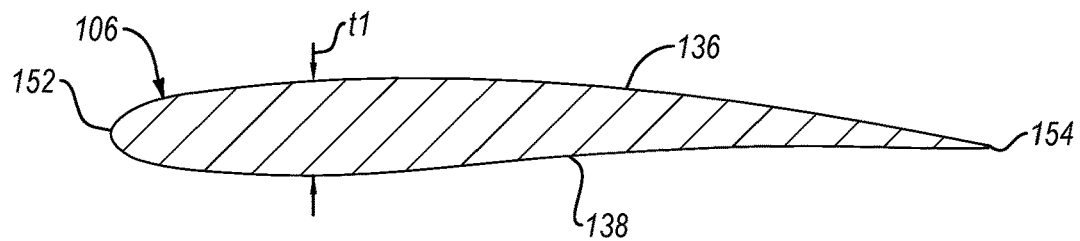
FIG. 6 is a cross-sectional side elevation view of the wing and the strut of the aircraft of FIG. 1, taken along the line 6-6 of FIG. 5, according to one or more examples of the present disclosure.
Figure 6:
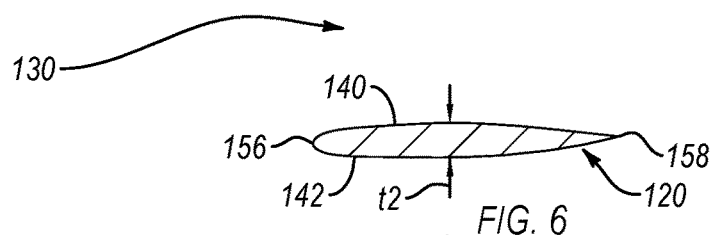
Figure 9:
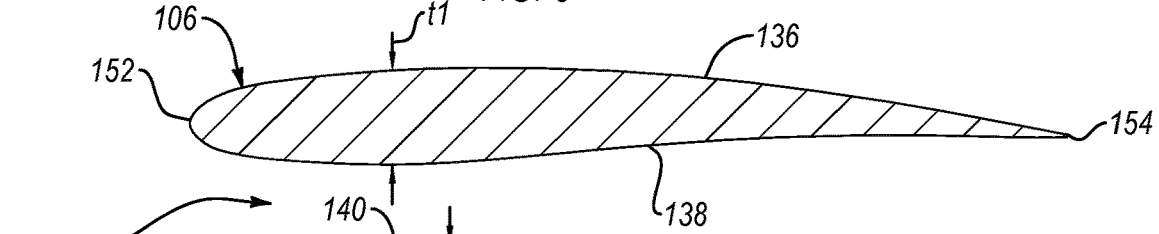
FIG. 9 is a cross-sectional side elevation view of the wing and the strut of the aircraft of FIG. 1, taken along the line 9-9 of FIG. 5, according to one or more examples of the present disclosure.

The configuration (e.g., shape) of the wing 106 can be defined in terms of the shape of the bottom surface 138 of the wing 106, which extends from a leading edge 152 of the wing 106 to a trailing edge 154 of the wing 106, along various planes. In the illustrated embodiment, a substantial portion (e.g., an entirety) of the bottom surface 138 of the wing 106 is curved (e.g., convex) along planes parallel to the chordwise direction 150 to define an airfoil shape. For example, as shown in FIG. 6, which is a cross-section of the wing 106 along a plane parallel to the chordwise direction 150 at a location between the first thinned portion 144 and the body 104, an entirety of the bottom surface 138 of the wing 106 is curved. Similarly, as shown in FIG. 9, which is a cross-section of the wing 106 along a plane parallel to the chordwise direction 150 at a location between, or just including, the first thinned portion 144 and the wing outboard end portion 162 of the wing 106, an entirety of the bottom surface 138 of the wing 106 is curved.

Figure 7:
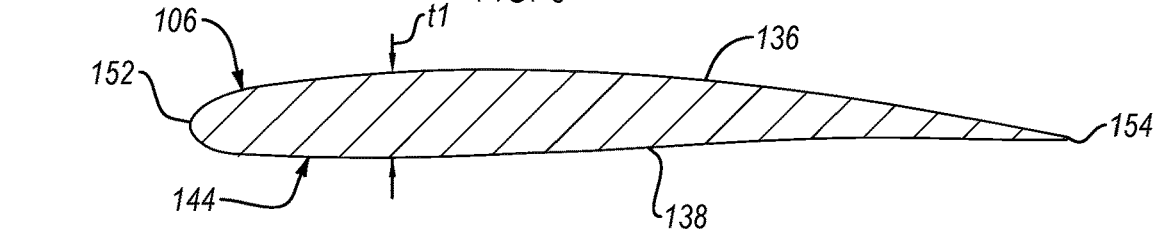
FIG. 7 is a cross-sectional side elevation view of the wing and the strut of the aircraft of FIG. 1, taken along the line 7-7 of FIG. 5, according to one or more examples of the present disclosure.
Figure 7:
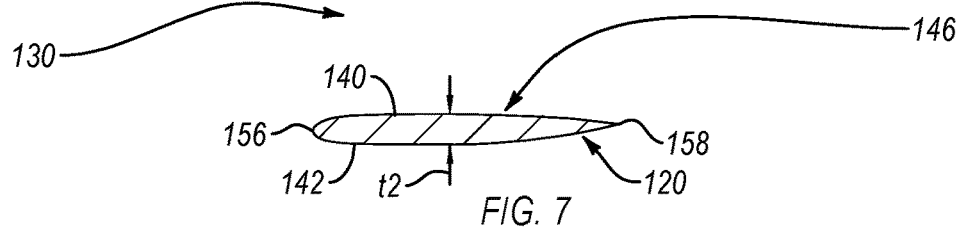
Figure 8:
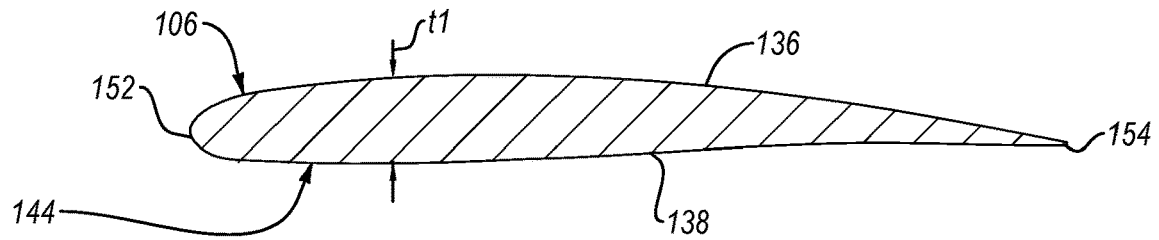
FIG. 8 is a cross-sectional side elevation view of the wing and the strut of the aircraft of FIG. 1, taken along the line 8-8 of FIG. 5, according to one or more examples of the present disclosure.
Figure 8:
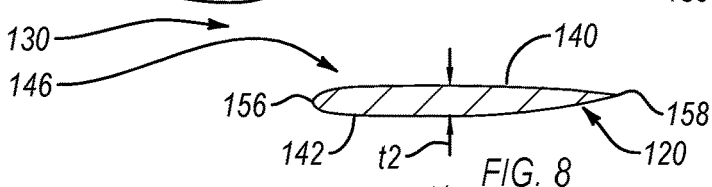

However, at least a portion of the bottom surface 138 of the wing 106 defining the first thinned portion 144 is flatter or less-curved along a plane parallel to the chordwise direction 150 than the rest of the bottom surface 138 of the wing 106. For example, as shown in FIGS. 7 and 8, which are cross-sections of the wing 106 along planes parallel to the chordwise direction 150 at two locations of the first thinned portion 144, at least a portion of the bottom surface 138 of the wing 106 defining the first thinned portion 144 is flatter or less-curved when viewed in the spanwise direction than the bottom surface 138 at the locations shown in FIGS. 6 and 9. The curvature of the bottom surface 138 of the wing 106 at the first thinned portion 144 varies in the spanwise direction 148. For example, the curvature of the bottom surface 138 of the wing 106 at the location shown in FIG. 7 is less than at the location shown in FIG. 6, but more than at the location shown in FIG. 8. As another example, the curvature of the bottom surface 138 of the wing 106 at the location shown in FIG. 8 is less than at the location shown in FIG. 7 and less than at the location shown in FIG. 9. As shown in FIGS. 6-9, in the spanwise direction 148 away from the body 104, the curvature of the bottom surface 138 of the wing 106 decreases from a high or maximum curvature (e.g., FIG. 6) to a low or minimum curvature (e.g., FIG. 8) and then increases back to a high or maximum curvature (e.g., FIG. 9). The drop in the curvature of the bottom surface 138 of the wing 106 effectuates the drop in the overall thickness t1 of the wing 106 at the first thinned portion 144.

Referring to FIG. 5, the configuration of the wing 106 can be defined in terms of the shape of the bottom surface 138 of the wing 106 along different planes compared to the planes in FIGS. 6-9. In some implementations, a substantial portion (e.g., an entirety) of the bottom surface 138 of the wing 106, exclusive of or not including the first thinned portion 144, is only slightly curved or locally substantially planar along a plane parallel to the spanwise direction 148. For example, as shown in FIGS. 2 and 5, the bottom surface 138 of the wing 106 between the first thinned portion 144 and the body 104 and between the first thinned portion 144 and the wingtip, along a plane parallel to the spanwise direction 148, has only a slight curvature (e.g., smaller than that along a plane parallel to the chordwise direction 150) or is locally substantially planar or flat. However, as also shown in FIGS. 2 and 5, at least a portion of the bottom surface 138 of the wing 106 at the first thinned portion 144 is more curved along the plane parallel to the spanwise direction 148. The curvature of the bottom surface 138 of the first thinned portion 144 of the wing 106 is curved (e.g., concave in some implementations) along the plane parallel to the spanwise direction 148. The curvature (e.g., concavity) of the bottom surface 138 of the first thinned portion 144 of the wing 106 effectuates the change in the overall thickness t1 of the wing 106 at the first thinned portion 144 in certain implementations.

Each strut 120 has an overall thickness t2 defined as the maximum distance between the top surface 140 of the strut 120 and the bottom surface 142 of the strut 120 at any given location along the strut 120. Some conventional struts on aircraft have an overall thickness that gradually reduces at a given rate in the spanwise direction from the body to the tip of the wing. In other words, some conventional struts do not have a dramatic increase or change in the rate that the overall thickness of the strut decreases in the spanwise direction away from the body. Moreover, some conventional struts do not have a change (whether an increase or decrease) in the overall thickness of the strut in the spanwise direction away from the body. Referring to FIG. 5, contrary to some conventional struts, the second thinned portion 146 of each strut 120 has an overall thickness t2 that decreases and increases in the spanwise direction 148. In the spanwise direction 148 away from the body 104, the overall thickness t2 of the second thinned portion 146 drops at a rate greater than any rate of reduction of the overall thickness t2 of the strut between the body 104 and the second thinned portion 146. The rate of increase of the overall thickness t2 of the second thinned portion 146 in the spanwise direction 148 away from the body 104 can be the same as or different than the rate of reduction of the overall thickness t2 of the second thinned portion 146 in the same direction. As shown by the strut thickness curve 174 of the chart 200 of FIG. 10, which shows one example of many possible examples of the strut thickness curve 174, a thickness-to-chord ratio (t/c) of the strut 120 compared to a normalized distance from the body 104 of the aircraft 100 experiences a dramatic drop at the start of the second thinned portion 146 and a subsequent dramatic increase up to the end of the second thinned portion 146.

The second thinned portion 146 is coextensive with the wing-strut channel 130. Accordingly, in the spanwise direction 148 away from the body 104, the second thinned portion 146 initiates at the third distance D3 away from the body 104 and terminates substantially at the second distance D2. The wing-strut channel 130 is bounded on bottom by the top surface 140 of the strut 120 at the second thinned portion 146 of the strut 120.

The configuration (e.g., shape) of the strut 120 can be defined in terms of the shape of the top surface 140 of the strut 120, which extends from a leading edge 156 of the strut 120 to a trailing edge 158 of the strut 120, along various planes. In the illustrated embodiment, a substantial portion (e.g., an entirety) of the top surface 140 of the strut 120 is curved (e.g., convex) along planes parallel to the chordwise direction 150 to define an airfoil shape. For example, as shown in FIG. 6, which is a cross-section of the strut 120 along a plane parallel to the chordwise direction 150 at a location between the second thinned portion 146 and the body 104, an entirety of the top surface 140 of the strut 120 is curved. Similarly, as shown in FIG. 9, which is a cross-section of the strut 120 along a plane parallel to the chordwise direction 150 at a location between, or just including, the second thinned portion 146 and the wing outboard end portion 162 of the wing 104, an entirety of the top surface 140 of the strut 120 is curved.

However, at least a portion of the top surface 140 of the strut 120 defining the second thinned portion 146 is flatter or less-curved along a plane parallel to the chordwise direction 150 than the rest of the top surface 140 of the strut 120. For example, as shown in FIGS. 7 and 8, which are cross-sections of the strut 120 along planes parallel to the chordwise direction 150 at two locations of the second thinned portion 146, at least a portion of the top surface 140 of the strut 120 defining the second thinned portion 146 is flatter or less-curved\when viewed in the spanwise direction than the top surface 140 at the locations shown in FIGS. 6 and 9. The curvature of the top surface 140 of the strut 120 at the second thinned portion 146 varies in the spanwise direction 148. For example, the curvature of the top surface 140 of the strut 120 at the location shown in FIG. 7 is less than at the location shown in FIG. 6, but more than at the location shown in FIG. 8. As another example, the curvature of the top surface 140 of the strut 120 at the location shown in FIG. 8 is less than at the location shown in FIG. 7 and less than at the location shown in FIG. 9. As shown in FIGS. 6-9, in the spanwise direction 148 away from the body 104, the curvature of the top surface 140 of the strut 120 decreases from a high or maximum curvature (e.g., FIG. 6) to a low or minimum curvature (e.g., FIG. 8) and then increases back to a high or maximum curvature (e.g., FIG. 9). The drop in the curvature of the top surface 140 of the strut 120 effectuates the drop in the overall thickness t2 of the strut 120 at the second thinned portion 146.

Referring to FIG. 5, the configuration of the strut 120 can be defined in terms of the shape of the top surface 140 of the strut 120 along different planes compared to the planes in FIGS. 6-9. In some implementations, a substantial portion (e.g., an entirety) of the top surface 140 of the strut 120, exclusive of or not including the second thinned portion 146, is only slightly curved or locally substantially planar along a plane parallel to the spanwise direction 148. For example, as shown in FIGS. 2 and 5, the top surface 140 of the strut 120 between the second thinned portion 146 and the body 104 and between the second thinned portion 146 and the intermediate portion 176 of the wing 106, along a plane parallel to the spanwise direction 148, has only a slight curvature (e.g., smaller than that along a plane parallel to the chordwise direction 150) or is locally substantially planar or flat. However, as also shown in FIGS. 2 and 5, at least a portion of the top surface 140 of the strut 120 at the second thinned portion 146 is more curved along the plane parallel to the spanwise direction 148. The curvature of the top surface 140 of the second thinned portion 146 of the strut 120 is curved (e.g., concave in some implementations) along the plane parallel to the spanwise direction 148. The curvature (e.g., concavity) of the top surface 140 of the second thinned portion 146 of the strut 120 effectuates the change in the overall thickness t2 of the strut 120 at the second thinned portion 146 in some implementations.

Referring again to FIG. 5, the bottom surface 138 of the first thinned portion 144 of the wing 106 faces the top surface 140 of the second thinned portion 146 of the strut 120 to define the air flow channel 130 between the bottom surface 138 of the first thinned portion 144 and the top surface 140 of the second thinned portion 146. As presented above, compared to conventional aircraft with wing-struts, the first thinned portion 144 and/or the second thinned portion 146 act to reduce shockwaves between the strut and wing (which shockwaves can increase an interference drag on an aircraft) by increasing the cross-sectional area between the strut and wing and reducing the acceleration of air through the area between the strut and wing, particularly when the aircraft is traveling at transonic speeds.

In some implementations, the first thinned portion 144 and the second thinned portion 146 act to change camber of the wing 106 and strut 120, respectively, relative to contiguous portions of the wing 106 and strut 120. For example, in one implementation where the top surface 136 of the wing 106 and the bottom surface 142 of the strut 120 at the air flow channel 130 is unchanged, the first thinned portion 144 of the wing 106 increases the camber of the wing 106 defining the air flow channel 130, and the second thinned portion 146 of the strut 120 decreases the camber of the strut 120 defining the air flow channel 130. However, in other implementations, the first thinned portion 144 and/or the second thinned portion 146 does not change the camber of the wing 106 and strut 120, respectively, relative to contiguous portions of the wing and strut 120. For example, where the top surface 136 of the wing 106 and the bottom surface 142 of the strut 120 at the air flow channel 130 are changed along with the bottom surface 138 of the wing 106 and the top surface 140 of the strut 120, the camber of the wing 106 and the strut 120 defining the air flow channel 130 can remain the same relative to contiguous portions of wing 106 and the strut 120.

The body 104, wing 106, and/or strut 120 is made from a fiber-reinforced polymer (e.g., carbon-fiber-reinforced polymer and glass-fiber-reinforced polymer), a metal, or a combination of a fiber-reinforced polymer and metal in some implementations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An aircraft, comprising:
a body;
a wing, coupled to and extending from the body, the wing comprising a wing inboard end portion, a wing outboard end portion, which is opposite the wing inboard end portion, and an intermediate portion between the wing inboard end portion and the wing outboard end portion; and
a strut, comprising a strut inboard end portion and a strut outboard end portion, the strut inboard end portion is coupled to and extends from the body and the strut outboard end portion is coupled to and extends from the intermediate portion of the wing;
wherein:
the wing further comprises a first thinned portion adjacent the intermediate portion of the wing;
an overall thickness of the first thinned portion of the wing decreases and increases in a spanwise direction along the wing;
the strut further comprises a second thinned portion adjacent the strut outboard end portion of the strut;
the first thinned portion and the second thinned portion define an air flow channel between the first thinned portion and the second thinned portion; and
an overall thickness of the second thinned portion of the strut decreases and increases in a spanwise direction along the strut.

2. The aircraft according to claim 1, wherein an area of at least a portion of the air flow channel increases in the spanwise direction along the strut away from the body.

3. The aircraft according to claim 1, wherein:
the wing comprises a first top surface and a first bottom surface;
the strut comprises a second top surface and a second bottom surface;
the first bottom surface of the wing at the first thinned portion of the wing is concave along a plane parallel to the spanwise direction.

4. The aircraft according to claim 1, wherein:
the wing comprises a first top surface and a first bottom surface;
the strut comprises a second top surface and a second bottom surface; and
the second top surface of the strut at the second thinned portion of the strut is concave along a plane parallel to the spanwise direction.

5. The aircraft according to claim 1, wherein:
the wing comprises a first top surface and a first bottom surface;
the strut comprises a second top surface and a second bottom surface;
the first bottom surface of the wing is curved along first planes parallel to a chordwise direction; and
a curvature of at least a portion of the first bottom surface of the wing defining the first thinned portion, along the first planes, decreases and increases in the spanwise direction.

6. The aircraft according to claim 1, wherein:
the wing comprises a first top surface and a first bottom surface;
the strut comprises a second top surface and a second bottom surface;
the second top surface of the strut is curved along second planes parallel to a chordwise direction; and
a curvature of at least a portion of the second top surface of the strut defining the second thinned portion, along the second planes, decreases and increases in the spanwise direction.

7. The aircraft according to claim 1, wherein
the wing comprises a first top surface and a first bottom surface;
the strut comprises a second top surface and a second bottom surface;
an entirety of the first bottom surface of the wing, exclusive of the first thinned portion, is planar along a third plane parallel to the spanwise direction;
at least a portion of the first bottom surface of the wing defining the first thinned portion is concave along the third plane;
an entirety of the second top surface of the strut, exclusive of the second thinned portion, is planar along a fourth plane parallel to the spanwise direction; and
at least a portion of the second top surface of the strut defining the second thinned portion is concave along the fourth plane.

8. The aircraft according to claim 1, wherein the wing has a span-to-chord ratio of at least 20:1.

9. The aircraft according to claim 1, wherein the aircraft is configured for travel at transonic speeds.

10. The aircraft according to claim 1, wherein:
the wing extends to a first distance away from the body;
the strut extends to a second distance away from the body;
the second distance is between about 40% and about 70% of the first distance;
the first thinned portion of the wing and the second thinned portion of the strut each begins at a third distance away from the body; and
the third distance is between about 30% and about 60% of the first distance.

11. An aircraft, comprising:
a body;
a wing, coupled to and extending from the body; and
a strut, comprising a strut inboard end portion and a strut outboard end portion, which is opposite the strut inboard end portion, the strut inboard end portion is coupled to and extends from the body and the strut outboard end portion is coupled to and extends from the wing;
wherein the strut further comprises a thinned portion adjacent the strut outboard end portion of the strut and an overall thickness of the thinned portion of the strut decreases and increases in a spanwise direction along the strut; and
wherein the thinned portion of the strut extends along less than 50% of an entire length of the strut.

12. The aircraft according to claim 11, wherein:
the strut comprises a top surface and a bottom surface, opposite the top surface;
the top surface of the strut is curved along first planes parallel to a chordwise direction; and
a curvature of at least a portion of the top surface of the strut defining the thinned portion, along the first planes, decreases and increases in the spanwise direction.

13. The aircraft according to claim 11, wherein a distance between a portion of the wing and a portion of the strut increases in the spanwise direction away from the body.

14. The aircraft according to claim 11, wherein:
the strut comprises a top surface and a bottom surface, opposite the top surface;
an entirety of the top surface of the strut, exclusive of the thinned portion, is planar in a spanwise direction along the strut; and
at least a portion of the top surface of the strut defining the thinned portion is curved in the spanwise direction along the strut.

15. The aircraft according to claim 14, wherein at least a portion of the top surface of the strut defining the thinned portion is concave in the spanwise direction along the strut.

16. An aircraft, comprising:
a body;
a wing, coupled to and extending from the body, the wing comprising a wing inboard end portion, a wing outboard end portion, which is opposite the wing inboard end portion, and an intermediate portion between the wing inboard end portion and the wing outboard end portion; and
a strut, comprising a strut inboard end portion and a strut outboard end portion, opposite the strut inboard end portion, the strut inboard end portion is coupled to and extends from the body and the strut outboard end portion is coupled to and extends from the intermediate portion of the wing;
wherein the wing further comprises a thinned portion adjacent the intermediate portion of the wing and an overall thickness of the thinned portion of the wing decreases and increases in a spanwise direction along the wing.

17. The aircraft according to claim 16, wherein:
the wing comprises a top surface and a bottom surface, opposite the top surface;
the bottom surface of the wing is curved along planes parallel to a chordwise direction; and
a curvature of at least a portion of the bottom surface of the wing defining the thinned portion, along the planes, decreases and increases in the spanwise direction.

18. The aircraft according to claim 16, wherein a distance between a portion of the wing and a portion of the strut increases in the spanwise direction away from the body.

19. The aircraft according to claim 16, wherein:
the wing comprises a top surface and a bottom surface, opposite the top surface;
an entirety of the bottom surface of the wing, exclusive of the thinned portion, is substantially planar along a plane parallel to the spanwise direction; and
at least a portion of the bottom surface of the wing defining the thinned portion is curved along the plane.

20. The aircraft according to claim 19, wherein at least a portion of the bottom surface of the wing defining the thinned portion is concave along the plane.

\* \* \* \* \*